Patented Aug. 7, 1945

2,381,059

UNITED STATES PATENT OFFICE 2,381,059

SYNTHETIC RUBBER COMPOSITION

Paul C. Jones, Silver Lake Village, Ohio, assignor to The B. F. Goodrich Company, New York, N. Y., a corporation of New York No Drawing. Application December 4, 1942, Serial No. 467,907

18 Claims. (Cl. 260—79).

This invention relates to a new method for the vulcanization of synthetic rubber and to the product obtained thereby. It pertains more specifically to the vulcanization of a synthetic rubber in the presence of a 2-mercaptothiazoline under conditions such that no free metallic oxide remains in the rubber composition after vulcanization.

It is well known that 2-mercaptothiazoline and its homologues are effective accelerators of rubber where they are suitably activated by the presence of a metallic oxide, such as, for example, zinc oxide. The metallic oxides which exercise an activating effect on 2-mercaptothiazoline and its homologues are, in general, the same ones which activate other mercapto accelerators such as mercaptobenzothiazole and are well known. A thorough study of the activating effect of various metallic oxides has been presented by Cotton et al., Rubber Chemistry and Technology, 11, 331 (1938), and by others. Among the oxides which are effective are litharge, red lead, cadmium oxide, zinc oxide, mercuric oxide, and bismuth trioxide. It has also been found that various monocarboxylic acids and their metallic salts have an activating effect upon the 2-mercaptothiazolines; among the acids which are effective are stearic, lauric, caprylic, linoleic, linolenic, oleic, benzoic, salicylic, and the like. The amounts of metallic oxide and monocarboxylic acid or metal salt used in the past have ranged from about 1.0 to about 5.0%, based on the rubber. Heretofore, however, sufficient metallic oxide has always been used so that an appreciable quantity of the metallic oxide has been present in the rubber composition after vulcanization, even though a portion of it may have reacted with the monocarboxylic acid or mercapto accelerator present.

I have now discovered that by carrying out the vulcanization of a synthetic rubber, using a 2-mercaptothiazoline accelerator in amounts ranging from about 0.1 to about 5.0%, in such a way that no metallic oxide remains in the rubber composition after vulcanization, the resultant rubber has greatly improved hysteresis properties. Such a rubber is particularly valuable for use in any structure which is subject to repeated deformation, such as pneumatic tires, rubber vibration insulators, shock absorbers, springs, etc., because of the great reduction in heat build-up in such structures afforded by the use of my new composition, and the resultant increase in the life of the structure.

My new rubber compositions may be prepared by using, in conjunction with a 2-mercaptothiazoline accelerator and either a monocarboxylic acid or its metallic salt, no more than the stoichiometric amount of an activating metallic oxide sufficient to react with the mercapto accelerator and the monocarboxylic acid present in the composition. It should be noted, however, that some of the softeners such as pine tar commonly used in synthetic rubbers are acidic and are capable of reacting with metallic oxides to form compounds compatible with the rubber. If such organic acidic ingredients are present in the rubber composition, additional metallic oxide may be present up to the stoichiometric amount which will react with such ingredients. Although the metallic oxide and fatty acid may be added separately to the rubber composition, as described above, they may also be reacted together before addition to the rubber, and added in the form of the metal salt of the acid.

Although a variety of monocarboxylic acids may be used, as stated above, the preferred class consists of fatty acids, particularly saturated fatty acids containing five or more carbon atoms, and their metal salts, particularly their salts with metals which form activating oxides.

Not only 2-mercaptothiazoline itself may be used to achieve the objects of my invention, but also its homologues and substitution products such as 2-mercapto-4-methylthiazoline
2-mercapto-5-methylthiazoline
2-mercapto-4,4-dimethylthiazoline
2-mercapto-4,5-dimethylthiazoline
2-mercapto-5,5-dimethylthiazoline
2-mercapto-4-ethylthiazoline
2-mercapto-4-butylthiazoline
2-mercapto-4-methyl-5-butylthiazoline
2-mercapto-4-phenylthiazoline
2-mercapto-4-benzylthiazoline
2-mercapto-4-betahydroxyethylthiazoline
2-mercapto-4-chlormethylthiazoline
2-mercapto-4-betachlorethylthiazoline
2-mercapto-4-hydroxythiazoline
2-mercapto-4-methoxymethylthiazoline
2-mercapto-4-aminothiazoline
2-mercapto-4-(p-aminophenyl) thiazoline
2-mercapto-4-anisylthiazoline
2-mercapto-5-chlorothiazoline
2-mercapto-5-hydroxythiazoline
2-mercapto-5-aminothiazoline
2-mercapto-4,5-cyclotetramethylenethiazoline
and other similar compounds.

The synthetic rubbers with which my new process is effective to produce compositions having excellent hysteresis properties are the rubbery materials, vulcanizable with sulfur, made by the polymerization of butadiene-1,3 hydrocarbons with ethylenic monomers copolymerizable therewith. Among the butadiene-1,3 hydrocarbons which may be used are butadiene-1,3; 2-methyl butadiene-1,3; 2,3-dimethyl butadiene-1,3 piperylene; and the like. Ethylenic compounds which may be copolymerized with the foregoing butadiene-1,3 hydrocarbons include, for example, styrene, acrylonitrile, isobutylene, methyl acrylate, ethyl acrylate, methyl methacrylate, and the like.

In order more clearly to show the superiorities of my new compositions, I shall describe a specific example of my invention.

Example

The following compositions were prepared, in which the parts are by weight

|  | A | B |
| --- | --- | --- |
| Rubbery copolymer of butadiene with styrene | 100 | 100 |
| Soft or semi-reinforcing black | 30 | 30 |
| Softener [1] | 10 | 10 |
| Sulfur | 2 | 2 |
| Zinc oxide | 5 | 0 |
| Zinc stearate | 0 | 5 |
| 2-mercaptothiazoline | 3 | 3 |

[1] A petroleum derivative sold under the trade name "Paraflux."

These compositions were then vulcanized in a press 120 minutes at 275° F. and tested in a Goodrich Flexometer, the construction and operation of which has been described by E. T. Lessig, Industrial and Engineering Chemistry [Anal. Edition] 9, 582 (1937). The results of the test are given in the following table, in which $\Delta TC$ is the increase in temperature of the sample when flexed at room temperature, and $\Delta TH$ is the increase in temperature of the sample when flexed at 212° F.

| Stock | $\Delta TC$ | $\Delta TH$ | Permanent set (%) at 212° F. |
| --- | --- | --- | --- |
| A | 79 | 35 | 9.5 |
| B | 51 | 23 | 4.3 |

Samples of the foregoing rubber compositions were then aged seven days in oxygen at 70° C. and 300 lb./sq. in., and tested in a Goodrich Flexometer under the same conditions as the original samples, with the following results:

| Stock | $\Delta TC$ | $\Delta TH$ | Permanent set (%) at 212° F. |
| --- | --- | --- | --- |
| A | 58 | 45 | 7.3 |
| B | 49 | 38 | 4.5 |

These data indicate very clearly the superiority of my new vulcanized rubber compositions over those containing a free metallic oxide, especially in regard to the rate of heat build-up in the rubber composition and the degree of permanent set.

The same metallic ion need not be present in both the metallic salt of the fatty acid and the activating metallic oxide; if desired, mixtures of different activating metallic oxides may also be used.

Any of the usual pigments, fillers, reinforcing agents, softeners, antioxidants, or other accelerators used as activators and promoters for the 2-mercaptothiazoline accelerators may also be present in the composition without destroying its superior properties.

I claim:

1. The method of vulcanizing a rubbery material made by the polymerization of a butadiene-1,3 hydrocarbon with a compound containing a single ethylenic double bond which comprises heating it in the presence of sulfur and a 2-mercaptothiazoline, and in the presence of a member of the class consisting of monocarboxylic acids and their salts with metals capable of forming activating oxides, and in the absence of more than the stoichiometric amount of activating metallic oxides sufficient to react with the acidic constituents of the composition during its vulcanization.

2. The method of vulcanizing a rubbery material made by the polymerization of a butadiene-1,3 hydrocarbon with a compound containing a single ethylenic double bond which comprises heating it in the presence of sulfur and a 2-mercaptothiazoline, and in the presence of a salt of a monocarboxylic acid with a metal capable of forming an activating oxide, and in the absence of activating metallic oxides.

3. The method of vulcanizing a rubbery material made by the polymerization of a butadiene-1,3 hydrocarbon with a compound containing a single ethylenic double bond which comprises heating it in the presence of sulfur and a 2-mercaptothiazoline, and in the presence of a monocarboxylic acid, and in the presence of no more than the stoichiometric amount of activating metallic oxides sufficient to react with the acidic constituents of the composition during its vulcanization.

4. The method of vulcanizing a rubbery material made by the polymerization of a butadiene-1,3 hydrocarbon with a compound containing a single ethylenic double bond which comprises heating it in the presence of sulfur and a 2-mercaptothiazoline, and in the presence of a salt of a fatty acid with a metal capable of forming an activating oxide, and in the absence of activating metallic oxides.

5. The method of vulcanizing a rubbery material made by the polymerization of a butadiene-1,3 hydrocarbon with a compound containing a single ethylenic double bond which comprises heating it in the presence of sulfur and a 2-mercaptothiazoline, and in the presence of a fatty acid, and in the presence of no more than the stoichiometric amount of activating metallic oxides sufficient to react with the acidic constituents of the composition during its vulcanization.

6. The method of vulcanizing a rubbery material made by the polymerization of a butadiene-1,3 hydrocarbon with a compound containing a single ethylenic double bond which comprises heating it in the presence of sulfur and 2-mercaptothiazoline, and in the presence of a salt of a fatty acid with a metal capable of forming an activating oxide, and in the absence of activating metallic oxides.

7. The method of vulcanizing a rubbery material made by the polymerization of a butadiene-1,3 hydrocarbon with a compound containing a single ethylenic double bond which comprises heating it in the presence of sulfur and 2-mercaptothiazoline, and in the presence of a fatty acid, and in the presence of no more than the stoichiometric amount of activating metallic oxides sufficient to react with the acidic constituents of the composition during its vulcanization.

8. The method of vulcanizing a rubbery material made by the polymerization of a butadiene-1,3 hydrocarbon with a compound containing a single ethylenic double bond which comprises heating it in the presence of sulfur and a 2-mercaptothiazoline, and in the presence of a zinc salt of a fatty acid, and in the absence of activating metallic oxides.

9. The method of vulcanizing a rubbery material made by the polymerization of a butadiene-1,3 hydrocarbon with a compound containing a single ethylenic double bond which comprises heating it in the presence of sulfur and 2-mercaptothiazoline and in the presence of a zinc salt of a fatty acid, and in the absence of activating metallic oxides.

10. A composition comprising a rubbery material made by the polymerization of a butadiene-1,3 hydrocarbon with a compound containing a single ethylenic double bond, vulcanized in the presence of sulfur and a 2-mercaptothiazoline, and in the presence of a member of the class consisting of monocarboxylic acids and their salts with metals capable of forming activating oxides, and in the absence of more than the stoichiometric amount of activating metallic oxides sufficient to react with the acidic constituents of the composition during its vulcanization.

11. A composition comprising a rubbery material made by the polymerization of a butadiene-1,3 hydrocarbon with a compound containing a single ethylenic double bond, vulcanized in the presence of sulfur and a 2-mercaptothiazoline, and in the presence of a salt of a monocarboxylic acid with a metal capable of forming an activating oxide, and in the absence of activating metallic oxides.

12. A composition comprising a rubbery material made by the polymerization of a butadiene-1,3 hydrocarbon with a compound containing a single ethylenic double bond vulcanized in the presence of sulfur and a 2-mercaptothiazoline, and in the presence of a monocarboxylic acid, and in the presence of no more than the stoichiometric amount of activating metallic oxides sufficient to react with the acidic constituents of the composition during its vulcanization.

13. A composition comprising a rubbery material made by the polymerization of a butadiene-1,3 hydrocarbon with a compound containing a single ethylenic double bond vulcanized in the presence of sulfur and a 2-mercaptothiazoline, and in the presence of a salt of a fatty acid with a metal capable of forming an activating oxide, and in the absence of activating metallic oxides.

14. A composition comprising a rubbery material made by the polymerization of a butadiene-1,3 hydrocarbon with a compound containing a single ethylenic double bond, vulcanized in the presence of sulfur and a 2-mercaptothiazoline, and in the presence of a fatty acid, and in the presence of no more than the stoichiometric amount of activating metallic oxide sufficient to react with the acidic constituents of the composition during its vulcanization.

15. A composition comprising a rubbery material made by the polymerization of a butadiene-1,3 hydrocarbon with a compound containing a single ethylenic double bond vulcanized in the presence of sulfur and 2-mercaptothiazoline, and in the presence of a salt of a fatty acid with a metal capable of forming an activating oxide, and in the absence of activating metallic oxides.

16. A composition comprising a rubbery material made by the polymerization of a butadiene-1,3 hydrocarbon with a compound containing a single ethylenic double bond vulcanized in the presence of sulfur and 2-mercaptothiazoline, and in the presence of a fatty acid, and in the presence of no more than the stoichiometric amount of activating metallic oxides sufficient to react with the acidic constituents of the composition during its vulcanization.

17. A composition comprising a rubbery material made by the polymerization of a butadiene-1,3 hydrocarbon with a compound containing a single ethylenic double bond vulcanized in the presence of sulfur and a 2-mercaptothiazoline, and in the presence of a zinc salt of a fatty acid, and in the absence of activating metallic oxides.

18. A composition comprising a rubbery material made by the polymerization of a butadiene-1,3 hydrocarbon with a compound containing a single ethylenic double bond vulcanized in the presence of sulfur and 2-mercaptothiazoline, and in the presence of a zinc salt of a fatty acid, and in the absence of activating metallic oxides.

PAUL C. JONES.